US009205381B2

(12) United States Patent
Fujita et al.

(10) Patent No.: US 9,205,381 B2
(45) Date of Patent: Dec. 8, 2015

(54) METHOD FOR DEWATERING WATER-CONTAINING ORGANIC SUBSTANCE

(75) Inventors: Suguru Fujita, Osaka (JP); Shiro Inoue, Osaka (JP); Yoshinobu Takaki, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 653 days.

(21) Appl. No.: 13/393,882

(22) PCT Filed: Sep. 1, 2010

(86) PCT No.: PCT/JP2010/064938
§ 371 (c)(1),
(2), (4) Date: Mar. 2, 2012

(87) PCT Pub. No.: WO2011/027787
PCT Pub. Date: Mar. 10, 2011

(65) Prior Publication Data
US 2012/0152840 A1 Jun. 21, 2012

(30) Foreign Application Priority Data

Sep. 2, 2009 (JP) ................................. 2009-202355

(51) Int. Cl.
*B01D 15/00* (2006.01)
*B01D 35/18* (2006.01)
(Continued)

(52) U.S. Cl.
CPC .............. *B01D 71/028* (2013.01); *B01D 53/22* (2013.01); *B01D 2311/04* (2013.01); *B01D 2311/2669* (2013.01); *B01D 2311/2673* (2013.01)

(58) Field of Classification Search
CPC ........ B01D 61/36; B01D 61/362; B01D 1/00; A47L 13/16; B01J 2523/00; B01J 2208/00539; B01J 2219/00074; B01J 2219/0871; C08J 3/122
USPC .................................. 210/640, 500.25; 95/52
See application file for complete search history.

(56) References Cited

U.S. PATENT DOCUMENTS 4,306,942 A    12/1981  Brush et al.
5,385,647 A *   1/1995  Brueschke et al. ............. 203/39
(Continued)

FOREIGN PATENT DOCUMENTS

JP       63-004827 A    1/1988
JP       63-054593 A    3/1988
(Continued)

OTHER PUBLICATIONS

Norbert Martin, "Separating Azeotropic Mixtures," Sulzer Technical Review, No. 3, 1998, pp. 12-15.
(Continued)

*Primary Examiner* — Ana Fortuna
(74) *Attorney, Agent, or Firm* — Locke Lord LLP

(57) ABSTRACT

The present invention is to provide a VP dewatering method being applicable over a wide range, having good handling properties, and being economically efficient and highly energy-saving, which comprises compression-pressuring a dewatered vapor product to elevate a condensation temperature thereof and then re-using the same as a heat source for vaporizing a supply liquid. In dewatering a water-containing organic substance which is a liquid starting material according to a vapor permeation membrane separation method, a dewatered organic substance vapor discharged from a membrane module is pressurized with a compressor to elevate the condensation temperature of the vapor and then the vapor is fed to a vaporizer of said method to collect and use the latent heat of condensation thereof.

5 Claims, 5 Drawing Sheets

(51) Int. Cl.
*C02F 1/44* (2006.01)
*B01D 71/02* (2006.01)
*B01D 53/22* (2006.01)

(56) References Cited

U.S. PATENT DOCUMENTS

| | | | |
|---|---|---|---|
| 5,607,557 A * | 3/1997 | Streicher | 203/39 |
| 7,141,707 B2 * | 11/2006 | Beckmann et al. | 568/913 |
| 7,594,981 B2 * | 9/2009 | Ikeda | 203/18 |
| 8,535,413 B2 * | 9/2013 | Bryan et al. | 95/45 |
| 2001/0025819 A1 * | 10/2001 | Bowser | 210/640 |
| 2004/0182786 A1 * | 9/2004 | Colling et al. | 210/640 |
| 2006/0070867 A1 | 4/2006 | Ikeda | |
| 2008/0099400 A1 * | 5/2008 | Nemser et al. | 210/638 |
| 2012/0152840 A1 * | 6/2012 | Fujita et al. | 210/640 |
| 2013/0153498 A1 * | 6/2013 | Kiuchi et al. | 210/640 |

FOREIGN PATENT DOCUMENTS

| | | |
|---|---|---|
| JP | 63-258601 A | 10/1988 |
| JP | 07-227517 A | 8/1995 |
| JP | 2005-177535 A | 7/2005 |
| WO | WO-2004/073841 A1 | 9/2004 |

OTHER PUBLICATIONS

International Search Report dated Nov. 30, 2010, issued for PCT/JP2010/064938.

* cited by examiner

METHOD FOR DEWATERING WATER-CONTAINING ORGANIC SUBSTANCE

TECHNICAL FIELD

The present invention relates to a method for dewatering a water-containing organic substance. Typical examples of dewatering a water-containing organic substance include i) dewatering of bioethanol into ethanol for automobile fuel, ii) regeneration of high-purity organic solvent used in washing or draining and drying in a process for producing semiconductor or liquid crystal, iii) removal of water to be an impurity, which is contained in an organic liquid for use as a starting material for production of various chemical products and drug products, iv) removal of by-product water, which is produced through reaction such as typically esterification to accumulate in the product to thereby interfere with the completion of the reaction, etc. In that manner, there are an extremely large number of fields that require water removal or dewatering of a water-containing organic substance, and the present invention is effectively applicable to these fields.

As a new energy-saving technique for dewatering of water-containing organic substances, vapor permeation (VP) membrane separation has become much employed. For wide-range popularization of VP technology, it is important to further enhance the efficiency (for energy saving) of the VP process.

BACKGROUND ART

Patent Reference 1 describes a method for condensing a water-containing organic substance, which comprises a combination of rough dewatering in a distillation column and subsequent VP dewatering, as shown in FIG. 2. According to the method, the overhead vapor that has been formed through concentration of a water-containing organic substance to the azeotropic composition thereof in a distillation column is all condensed to liquid, and a part of the condensed liquid is fed to a VP unit. In the VP unit, first, the supplied liquid is wholly vaporized in a vaporizer at a high temperature at which the VP driving force is large, and the vapor is dewatered through a membrane. Heat must be given to the vaporizer by a heated vapor externally applied thereto, and the dewatered product vapor is fed to the reboiler at the bottom of the distillation column and condensed to recover the heat.

The method is characterized in that, even when the distillation column is designed for normal pressure or reduced pressure under which a water-containing organic substance can be readily concentrated to a high concentration (the azeotropic concentration thereof is high), and without being bound by it, the pressure of the vapor to be introduced into the VP unit can be increased to a high pressure by elevating the vaporization temperature and the VP driving force can be thereby increased to reduce the membrane area.

As described above, the latent heat of the product vapor must be recovered for the heat source of the reboiler at the bottom of the distillation column in order not to detract from the energy-saving merit, but the distillation column part and the VP part could not always be well balanced in point of the quantity of heat and, in addition, when the operation load fluctuates, the two would mutually affect each other, therefore causing a problem in the operation flexibility. Accordingly, a system is desired that secures operation of the distillation column part and the VP part with highest efficiency.

In relation to the problem with the method of Patent Reference 1, a technique for energy saving and efficiency enhancement of a rectifier part is described in Patent Reference 2. This is a distillatory apparatus for water-containing alcohol, comprising multiple rectifiers (10) and (11) that are operated under different pressures, as shown in FIG. 4, and is a system in which the overhead vapor of the high-pressure rectifier (10) is used as the heat source for the low-pressure rectifier (11). In case where the rectifier part is designed for energy saving as in this, the heat recovered from the VP part does not serve any purpose, and therefore it is highly necessary to enhance efficiency inside the region of the VP part.

FIG. 5 in Non-Patent Reference 1 (see FIG. 5 attached here) shows one example of a flow diagram of a combination of a distillation column and VP. In this flow, the vapor not condensed in the reflux condenser of the distillation column overhead vapor is fed to the VP part while kept as vapor. In case where the operation pressure in the distillation column is designed high, the system could be simple with high efficiency; but in case where a VP unit is arranged later in the distillation column designed for atmospheric pressure or reduced pressure (in vacuum), the pressure on the primary side of the VP unit must be atmospheric pressure or in vacuum, and as a result, the VP driving force may be small, a large membrane area may be necessary and sufficient dewatering could not be attained. Accordingly, a system for the VP part not bound by the designed pressure of the distillation column is important.

In case where water is removed to a high degree from a dilute aqueous solution of an organic substance such as ethanol produced through fermentation, and when the aqueous solution is directly fed and processed through membrane separation (especially VP), then the membrane area may be too large. Therefore, it is widely known by those skilled in the art that the solution is generally concentrated first in a distillation column to a range in which it can be concentrated reasonably (in a system where an azeotrope with water is formed, the solution is concentrated to a concentration somewhat lower than the azeotropic composition), followed by VP-dewatering, and the process of this type is favorable from the viewpoint of the equipment cost and the operating cost. In such a case, for enhancing the efficiency in the VP part without being influenced by the designing condition for the distillation column, all the overhead distillate in the distillation column is condensed into a liquid and the resulting liquid is fed to the finishing VP part, as shown in FIG. 2 (Patent Reference 1), and the method is one extremely effective method. In investigating the enhancement of the efficiency in the VP part, when the starting material supply mode to the VP part is limited to the case where the material is fed thereto in the form of a liquid, then the efficiency in the distillation part can be enhanced according to the method shown in Patent Reference 2 or the like and the efficiency of the VP part can be enhanced by applying thereto the present invention to be mentioned hereinunder, and consequently the efficiency of both the two can be enhanced basically with no mutual interference with each other. There are many application cases where the starting material is liquid, such as a case where dewatering is attained in an existing water-containing product distillation column arranged later or a case of dewatering and repurification of solvent used in precision washing in an electronic industry, etc., and therefore the industrial applicability of the invention of enhancing the efficiency of the VP system for a liquid starting material is great.

An example of the constitution of the VP part for a case where the starting material is liquid is shown as the VP part in FIG. 2 (Patent Reference 2), and for clarifying the difference between the constitution thereof and the constitution of the present invention, a basic constitution of an already-existing liquid material VP is shown separately in FIG. 3.

CITATION LIST

Patent Reference 1: WO2004/073841
Patent Reference 2: U.S. Pat. No. 4,306,942
Non-Patent Reference 1: Norbert Martin, "Separating Azeotropic Mixtures", Sulzer Technical Review, No. 3 (1998), pp. 12-15

SUMMARY OF THE INVENTION

Problems that the Invention is to Solve

The most significant problem with the liquid material VP in FIG. 3 is that the energy consumption is large. Regarding this, estimates of the primary necessary energy in prior art for typical operation condition are shown below, based on the flow of FIG. 3. The flow of FIG. 3 is a relatively simple one for simplifying the description.

The basis of the estimation is as follows:
Starting material: Aqueous ethanol solution having a concentration of 92.5 wt. % (95.0 vol. %), at a temperature of 30° C. and at a feed rate of 7,200 kg/h,
Vaporization temperature in vaporizer (=membrane module inlet port vapor temperature): 130° C.,
Dewatered product: Having a concentration of 99.7 wt. % (99.8 vol. %), at a yield of 6,600 kg/h (200 kL/day) and at a temperature of 37° C.

The primary necessary energy in this system is as follows:
Quantity of heat needed for preheating up to the vaporization temperature of the starting material: $5.71 \times 10^5$ kcal/h (mean specific heat of the starting material solution from 30 to 130° C., 0.793 kcal/kg·° C.),
Quantity of heat capable of being recovered simultaneously with cooling of the product liquid, through heat exchange of the liquid starting material with the dewatered product liquid having high temperatures: $4.40 \times 10^5$ kcal/h (the mean specific heat of the product liquid from 125 to 37° C. is 0.757 kcal/kg·° C.),
Quantity of heat necessary for preheating by external heat source: $5.71 \times 10^5$ kcal/h–$4.40 \times 10^5$ kcal/h=$1.31 \times 10^5$ kcal/h (the liquid starting material temperature at the preheating/cooling heat exchanger outlet port is about 107° C.),
Quantity of heat necessary for vaporization of starting material in vaporizer: $1.43 \times 10^6$ kcal/h (vaporization latent heat of the starting material is 199.1 kcal/kg).
Quantity of heat to be given to vaporizer (preheating+vaporization): $1.74 \times 10^6$ kcal/h (in case where the condensation latent heat, 507.2 kcal/kg, of saturated water vapor at 150° C. is used as the heating source, the necessary amount of heated water vapor is 3.43 ton/h).

In case where cooling is needed, the quantity of heat is as follows:
Quantity of cooling heat necessary for condensation of dewatered ethanol: $1.20 \times 10^6$ kcal/h (the condensation latent heat of product vapor is 181.6 kcal/kg) (in case where cooling water from 32 to 40° C. is used, the amount of cooling water necessary for condensation and cooling of the product is 150 ton/h),
Quantity of cooling heat necessary for condensation of vapor having permiated membrane: Regarding this matter, there is no substantial change even in the case of the present invention to be described hereinunder, and this is omitted here as unnecessary for comparison.

As in the above, the VP part in the already-existing system shown in FIG. 3 requires a large quantity of heat for vaporization, and for condensation of the product vapor, the quantity of heat near to that value must be removed. However, at the temperature thereof to be removed, the heat is useless inside the VP part, and therefore it should be discarded to cooling water, or as in FIG. 2 (Patent Reference 1), it must be inevitably used in any other part at a low temperature; but as mentioned above, in many cases, such could not be an effective resolution. Accordingly, in case where a system for utilizing the quantity of heat to be removed, effectively inside the VP part can be realized, then the system is extremely effective.

In view of the above-mentioned situation, the present invention is to provide a VP dewatering method being applicable over a wide range, having good handling properties and being economically efficient and highly energy-saving, which comprises compression-pressuring a dewatered vapor product to elevate the condensation temperature thereof and then re-using the same as a heat source for vaporizing a supply liquid.

Means for Solving the Problems

The present invention is a method for dewatering a water-containing organic substance, which comprises vaporizing the water-containing organic substance, a liquid starting material, in a vaporizer, and dewatering the vaporized water-containing organic substance by a vapor permeation membrane separation method using a membrane VP module, characterized in that the dewatered organic substance vapor discharged from the membrane VP module is pressurized with a compressor to elevate the condensation temperature of the vapor and then the vapor is fed to the vaporizer to collect and use the latent heat of condensation thereof.

In the dewatering method of the invention, preferably, after the latent heat of condensation of the dewatered organic substance vapor is used in the vaporizer, the resulting high-temperature condensate is cooled by preheating of the starting material. Preferably, as the heating source for the vaporizer, the latent heat of condensation of the dewatered organic substance vapor and an external fluid are used. As the vaporizer, preferably used is a horizontal tube bundle-type liquid membrane vaporizer of which the heat transfer coefficient change in temperature difference is small and which can keep high efficiency. As the membrane, preferably used is a zeolite membrane.

The VP separation method for dewatering a water-containing organic substance is a method that comprises vaporizing a water-containing organic substance, a liquid starting material, by imparting heat thereto in a vaporizer, introducing the thus-formed starting material vapor into a membrane module by using the difference between the vaporization pressure thereof and the condensation pressure of the vapor after dewatered, bringing the vapor into contact with the primary surface of the VP membrane at a high speed, then keeping low the condenser pressure of the vapor having permiated the membrane by suitable cooling and removal of non-condensed gas to thereby maintain the driving force of water for membrane permeation, and attaining selective membrane permeation of water in the starting material through the membrane module, thereby discharging the dewatered organic substance vapor of which the water content is not higher than a defined level.

The invention is described more concretely hereinunder.
As described above, in the already-existing liquid material VP system, most quantity of heat given in the vaporizer is discarded in cooling water or the like in the process of condensation or cooling of the product vapor. There may be partial improvement measures of preheating the liquid starting material by using the condensation heat of the product vapor or the like, which, however, could not be said to be a substantial resolution.

In the present invention, all the latent heat of condensation that the product vapor has is collected and used not only for preheating the liquid starting material but also as a heat source for vaporization thereof, whereby the energy-saving performance of the VP part is significantly enhanced.

For clarifying the effectiveness of the present invention, herein described is the significant energy-saving performance improvement by addition of a novel technique while the core part of the VP part including the operation condition therein is kept entirely the same; however, the effectiveness of the invention does not overstep the real nature of the invention even though the system, the instrument or the operation condition may be improved or modified in some degree by ordinary knowledge of those skilled in the art. Like in the description of the already-existing technique given hereinabove, the invention will be described for the system for water removal or dewatering of an aqueous ethanol solution; however, needless-to-say, the invention should include any and every water-containing organic substance to which ordinary VP is directed.

A basic method of dewatering in the invention is as follows.

The vapor to go out of the membrane module is on a product grade as the composition thereof, however, the entire quantity of the vapor is fed into a compressor and pressurized more than the pressure of the vapor to go out of the vaporizer, thereby increasing the pressure of the vapor (consequently, the temperature of the pressurized vapor rises). The vapor to go out of the membrane module has an extremely low water content, and is a fluid that hardly causes corrosion and deterioration of the compression system.

The product vapor having been pressurized and heated in the compressor is used as the heat source for the vaporizer in place of ordinary heated water vapor. In the vaporizer, the pressurized product vapor is cooled by vaporization of the liquid starting material, thereby to be a dewatered product liquid.

It is desirable that the product liquid to be taken out of the system is, in general, immediately cooled to around room temperature for preventing vaporization, however, the heat can be used for preheating the liquid starting material.

For enhancing the efficiency of the invention, it is important that the power needed for compressor operation is minimized as much as possible relative to the constant quantity of latent heat of condensation to be recovered. Basically, it is the most important to design the compression ratio as small as possible.

Consequently, the heat transfer temperature difference in the vaporizer is small. Many already-existing vaporizers such as kettle-type vaporizers use boiling heat transfer, but the boiling heat transfer depends on temperature difference, and therefore when the temperature difference is small, then the transfer area rapidly increases. For evading the trouble, it is important to use a vaporizer having good transfer performance in small temperature difference. Specifically, use of a liquid-membrane type vaporizer is the most suitable, which uses a bundle of horizontal tubes, depends little on heat transfer temperature difference and has a good heat transfer coefficient both on the extra-tube vaporization side and on the intra-tube vaporization side.

It is important that the selection of the type of compressor and the condition settlement for the compression ratio, the temperature difference between vaporizers and others must be optimized on the basis of the individual operation conditions. Those shown in Examples given below are only some example cases, and the application range of the invention should not be limited thereto. In particular, it is to be noted that the application conditions such as typically selection of the type of compressor greatly depend on the scale of equipment.

As a method similar to the invention, a method may be taken into consideration, in which the vaporization pressure of the vaporizer is planned low and the vaporized vapor is pressurized by a compressor, then fed to a membrane module, and the product vapor having gone out of the membrane module is used as the heat source for the vaporizer (hereinafter referred to as "similar method"); however, the method of the invention is superior to the similar method for the following reasons.

i) In case where the pressure of the starting material vapor to be fed to the membrane module is kept constant (for the purpose of clarifying the energy consumption reducing effect in the same VP membrane area), the mass flow rate of the vapor to be compressed in the invention is smaller than in the similar method, since the vapor around the membrane module inlet port contains water but water has been removed from the vapor around the membrane module outlet port; and therefore, in the invention, the power needed for operating the compressor can be small.

ii) Also in case where the pressure of the starting material vapor to be fed to the membrane module is kept constant, the power needed for compressor operation for the same mass flow rate can be smaller in the invention than in the similar method, since the pressure of the running-in fluid is higher and the specific volume of the vapor is smaller (as the vapor density is larger) in the invention than in the similar method. In fact, as described in the above i), since the mass flow rate in the invention is smaller than in the similar method, the power for compressor operation is further smaller in the invention than in the similar method.

iii) In case where the vapor to be fed to the membrane module is an overheated vapor, the VP performance lowers. In the similar method, the overheated vapor having gone out of the compressor is fed to the membrane module; but the invention is quite free from the risk. In the invention, a saturated vapor is always fed to the membrane module and therefore the VP membrane performance can be kept optimum.

iv) In the similar method, a water-containing vapor must be compressed, therefore having a risk of corrosion of the compressor system; but in the invention, a dewatered vapor is compressed, and is therefore from the risk of corrosion and deterioration of the compressor system.

Advantage of the Invention

According to the invention, there is provided a VP dewatering method being applicable over a wide range, having good handling properties and being economically efficient and highly energy-saving, which comprises compression-pressuring a dewatered vapor product to elevate the condensation temperature thereof and then re-using the same as a vaporization heat for a supply liquid.

MODE FOR CARRYING OUT THE INVENTION

Next, for concretely describing the invention, Examples of the invention are given below.

Example 1

Figure 1:
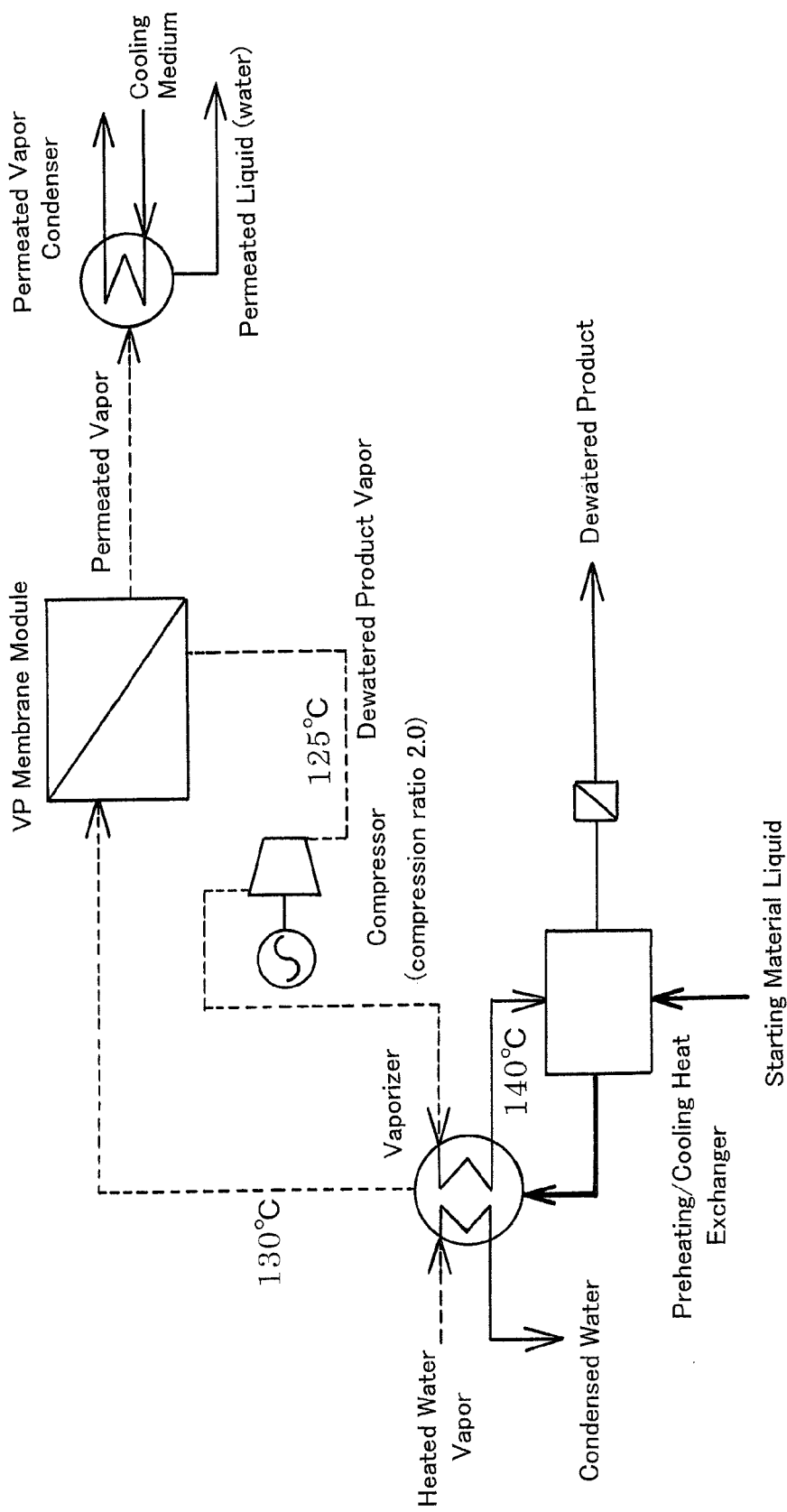
FIG. 1 is a flow diagram showing the basic constitution of the invention.
Figure 2:
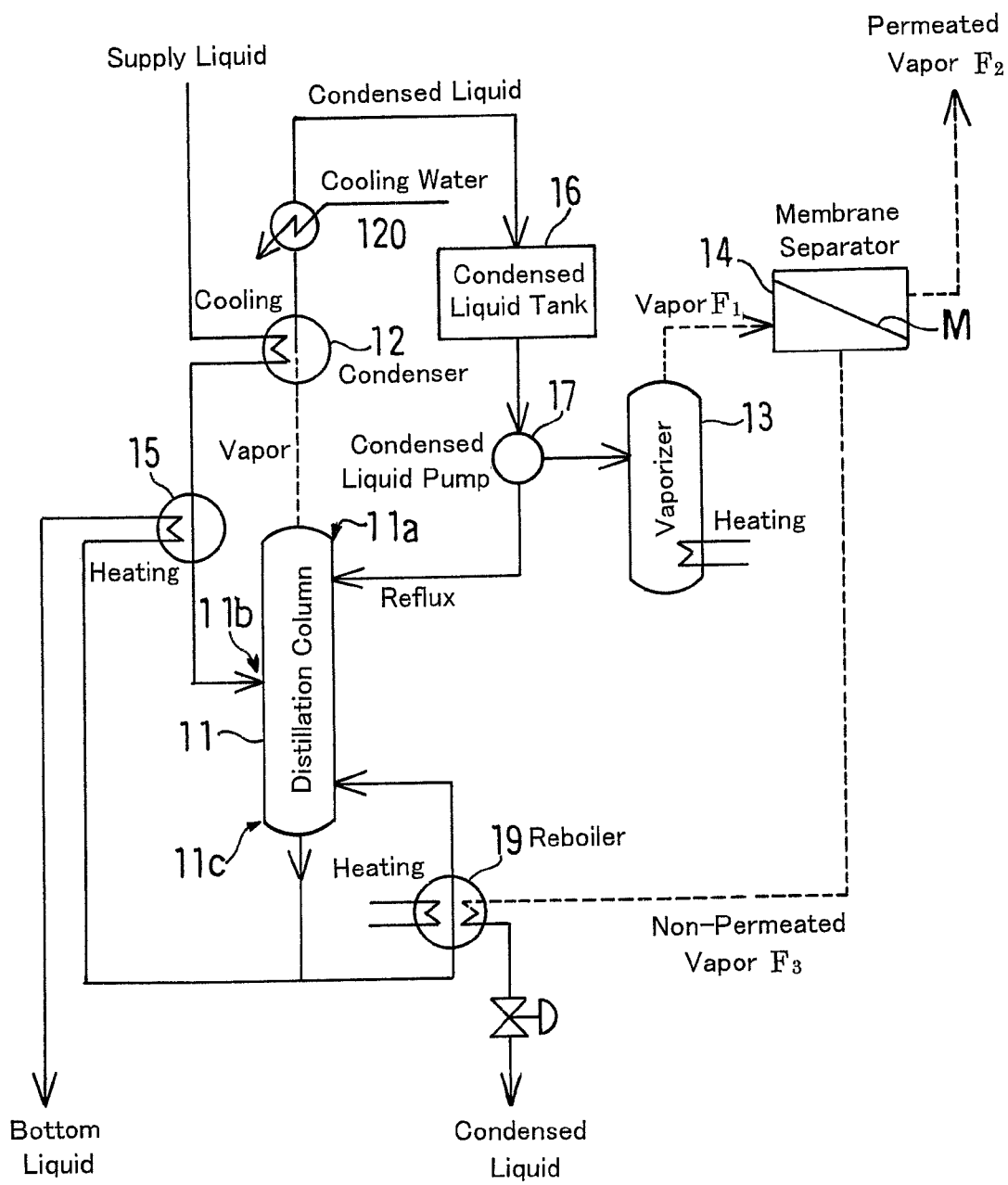
FIG. 2 is a flow diagram showing the system constitution in Patent Reference 1.

FIG. 1 shows the basic constitution (basic flow) of the invention. Some modification and change made by ordinary knowledge of those skilled in the art should not overstep the subject matter of the invention.

The liquid starting material, water-containing ethanol (having a concentration of 92.5 wt. % (95.0 vol. %) at a temperature of 30° C. and at a feed rate of 7,200 kg/h) is first introduced into a preheating/cooling heat exchanger, in which the dewatered ethanol liquid product (having a concentration of 99.7 wt. % (98.0 vol. %) at a yield of 6,600 kg/h (200 kL/day)) is cooled (the mean specific heat of the product liquid in cooling from a temperature 140 to 37° C. is 0.765 kcal/kg·° C.) and simultaneously the liquid starting material is preheated.

The liquid starting material is an aqueous ethanol solution having a concentration of 92.5 wt. % (95.0 vol. %), and the feed rate thereof is 7,200 kg/h. The mean specific heat in heating from a temperature 30 to 130° C. is 0.793 kcal/kg·° C.

For cooling the product, heat of $5.2 \times 10^5$ kcal/h must be removed. When the heat is used for preheating the liquid starting material, then the liquid starting material at the preheating/cooling heat exchanger outlet port could be at a temperature of 121° C. The preheated liquid starting material is so introduced as to form a liquid membrane outside the tubes of the tube bundle in the vaporizer.

The vaporization temperature in the vaporizer (=membrane module inlet port vapor temperature) was 130° C. The mean latent heat of vaporization of the starting material at a temperature of 130° C. is 199.1 kcal/kg.

In the vaporizer, it is necessary to preheat the liquid starting material from a temperature 121 to 130° C. ($4.7 \times 10^4$ kcal/h) and to impart the heat of vaporization ($1.43 \times 10^6$ kcal/h) relative to the entire amount of the supply liquid at a temperature of 130° C. The quantity of heat to be given in the vaporizer is $1.48 \times 10^6$ kcal/h in total. The entire amount of the vapor at 130° C. that has vaporized in the vaporizer is introduced into the membrane module. In the membrane module, the vapor of water-containing ethanol flows from one end to the other end at a high speed while kept in contact with the outer surface of the zeolite membrane element, and water selectively penetrates through the membrane and is thereby removed. Inside the membrane element (on the transmitted site), the pressure is kept low at around 10 kPa owing to the action of the permeated vapor condenser and through removal of the non-condensed gas by a small-capacity vacuum pump that acts for securing good action of the condenser (not shown in the drawing), for the purpose of keeping the flow rate of the permeated water flux. For cooling the transmitted vapor condenser, a cooling medium at a lower temperature than the cooling water that circulates through the cooling tower may be necessary; however, the condition is quite the same also in the already-existing VP system (FIG. 3) and therefore the cooling medium is not important for comparing the two, and consequently, its details are omitted here.

The ethanol vapor having passed through the multiple membrane modules in series and going out of the last membrane module is dewatered and condensed to have a concentration of 99.7 wt. % (99.8 vol. %). The minor pressure loss owing to the flow resistance in the membrane modules was balanced with the small heat loss therein, and the vapor at the membrane module outlet port was substantially a saturated vapor at 125° C. (having a pressure of 4.88 atm).

The dewatered ethanol vapor is introduced into the suction side of the compressor, and mechanically compressed up to a pressure of 7.42 atom (at a saturation temperature of 140° C.) (compression ratio 1.52). Needless to say, the compressor to be used here must be an efficient one, and in addition, the compressor must be a tough one enough to be resistant to long-term continuous operation, must be a highly safe one since a combustible fluid is compressed therein, and must be free from the possibility of contamination thereof with any impurities that may have some negative influences on the quality of the product such as oil or the like since the fluid to be the product is compressed therein; and in consideration of these requirements, a most suitable one must be selected. In this Example, a dry-screw compressor was used, but needless-to-say, this is not a necessary requirement in the invention.

The balance between the power necessary for operation of the compressor and the energy-saving effect that can be realized by the invention (as described below, essentially saving of the heated water vapor to be used in the vaporizer) determines the effectiveness of the invention.

The necessary power of the compressor is evaluated by the following:

Theoretical Adiabatic Compression Power $L_{ad} =$ $$\{(Q \cdot P_s/60 \cdot \kappa/(\kappa-1)\}\{(P_d/P_s)^{(\kappa-1)/\kappa} - 1\},$$

wherein $L_{ad}$ is the theoretical adiabatic compression power kW; Q is the suction gas amount m³/min; $P_s$ is the suction pressure kPa; $P_d$ is the discharge pressure kPa; $\kappa$ is the specific heat; and $L_{ad}$=56.7 kW when Q=16, $P_s$=494, $P_d$=752 and $\kappa$=1.15.

Necessary Power $L=/\eta_{ad}$, where $\eta_{ad}$ is the adiabatic efficiency of the compressor, and when $\eta_{ad}$=0.6, then L=95 kW.

The temperature of the compression discharge vapor is evaluated by $T_d/T_s=1(1/\eta_v)((\kappa-1)/\kappa)(P_d/P_s-1)$.

In the above, $T_d$ is the discharge vapor temperature K, $T_s$ is the suction vapor temperature K, $\eta_v$ is the volume efficiency of the compressor; and $T_d$=437 K=164° C. when $T_s$=398 and $\eta_v$=0.7. In other words, since the saturation temperature (condensation temperature) at a discharge pressure of 7.42 atom is 140° C., the compressor discharge vapor is in state superheated by 24° C. Since the mean specific heat of the vapor from 164 to 140° C. is 0.435 kcal/kg·° C., the quantity of superheat of this vapor is $6.89 \times 10^4$ kcal/h and, though not so large, it is the quantity of heat capable of being used in the vaporizer.

The high-pressure dewatered product vapor discharged out of the compressor is introduced into the in-tube side of the tube bundle in the vaporizer, and while the sensible superheat and the latent heat of condensation are collected, the vapor is condensed at 140° C. Since the latent heat of condensation of the ethanol vapor at 140° C. is 168.5 kcal/kg, the quantity of heat that can be collected here is the sum of the above-mentioned sensible superheat $6.89 \times 10^4$ kcal/h and the condensation heat $1.11 \times 10^6$ kcal/h, or that is, $1.18 \times 10^6$ kcal/h.

As described above, the recovered heat $1.18 \times 10^6$ kcal/h can be applied to a part of the quantity of heat to be given in the vaporizer $1.48 \times 10^6$ kcal/h, and therefore, the quantity of heat that must be directly given to the vaporizer by the external heat source (heated water vapor) is $3.7 \times 10^5$ kcal/h.

As in the above, the dewatered ethanol liquid that has been condensed after its heat was given to the vaporizer is at a temperature of 140° C., and therefore, it must be cooled before fed to the product reservoir. This is attained in the preheating/cooling heat exchanger described first, and the liquid cooled to 37° C. is finally the dewatered ethanol (having a product concentration of 99.7 wt. % (99.8 vol. %) at a yield of 6,600 kg/h (200 kL/day) and at a temperature of 37° C.).

Figure 3:
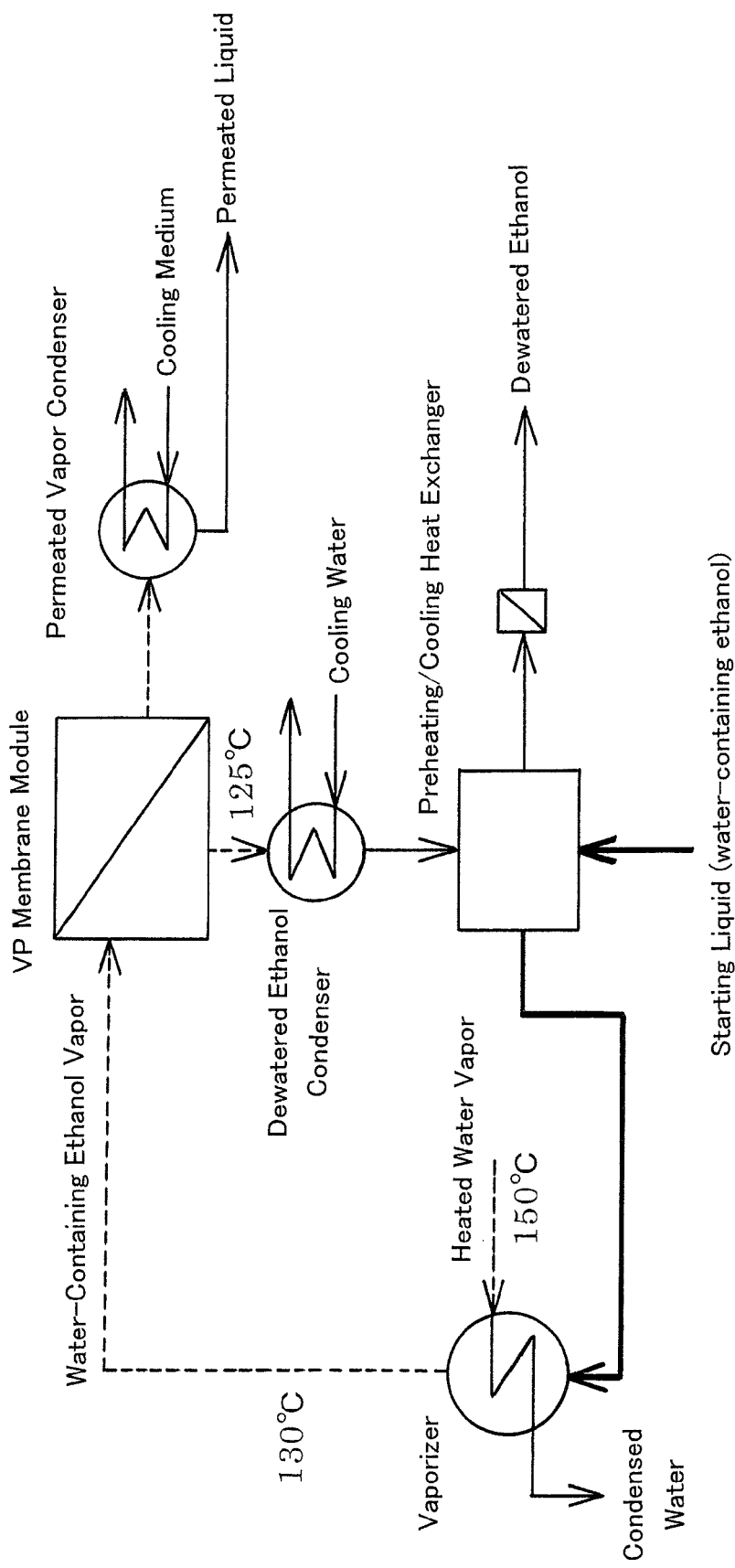
FIG. 3 is a flow diagram showing the system constitution in a conventional technology.
Figure 4:
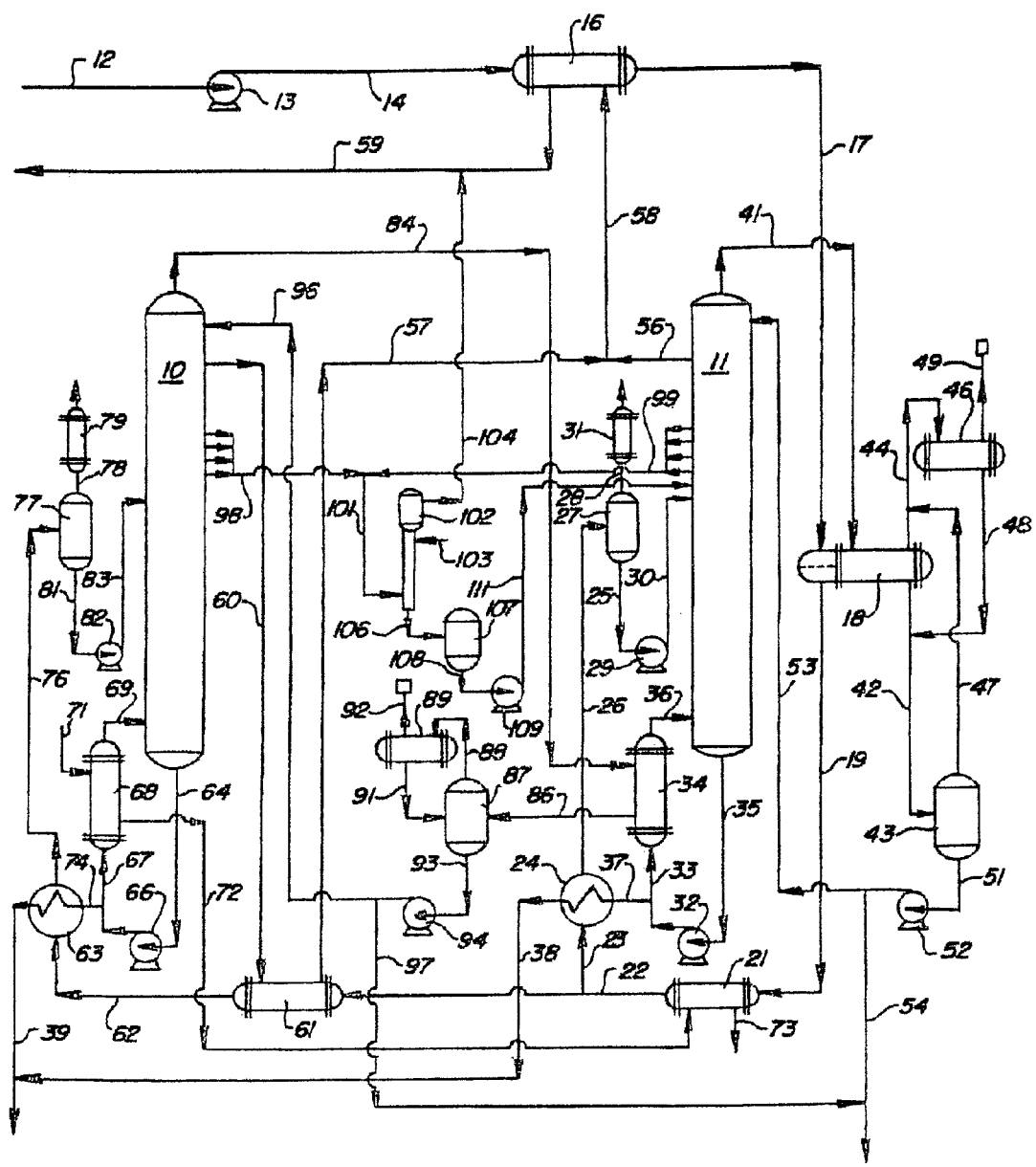
FIG. 4 is a flow diagram showing the system constitution in Patent Reference 2.
Figure 5:
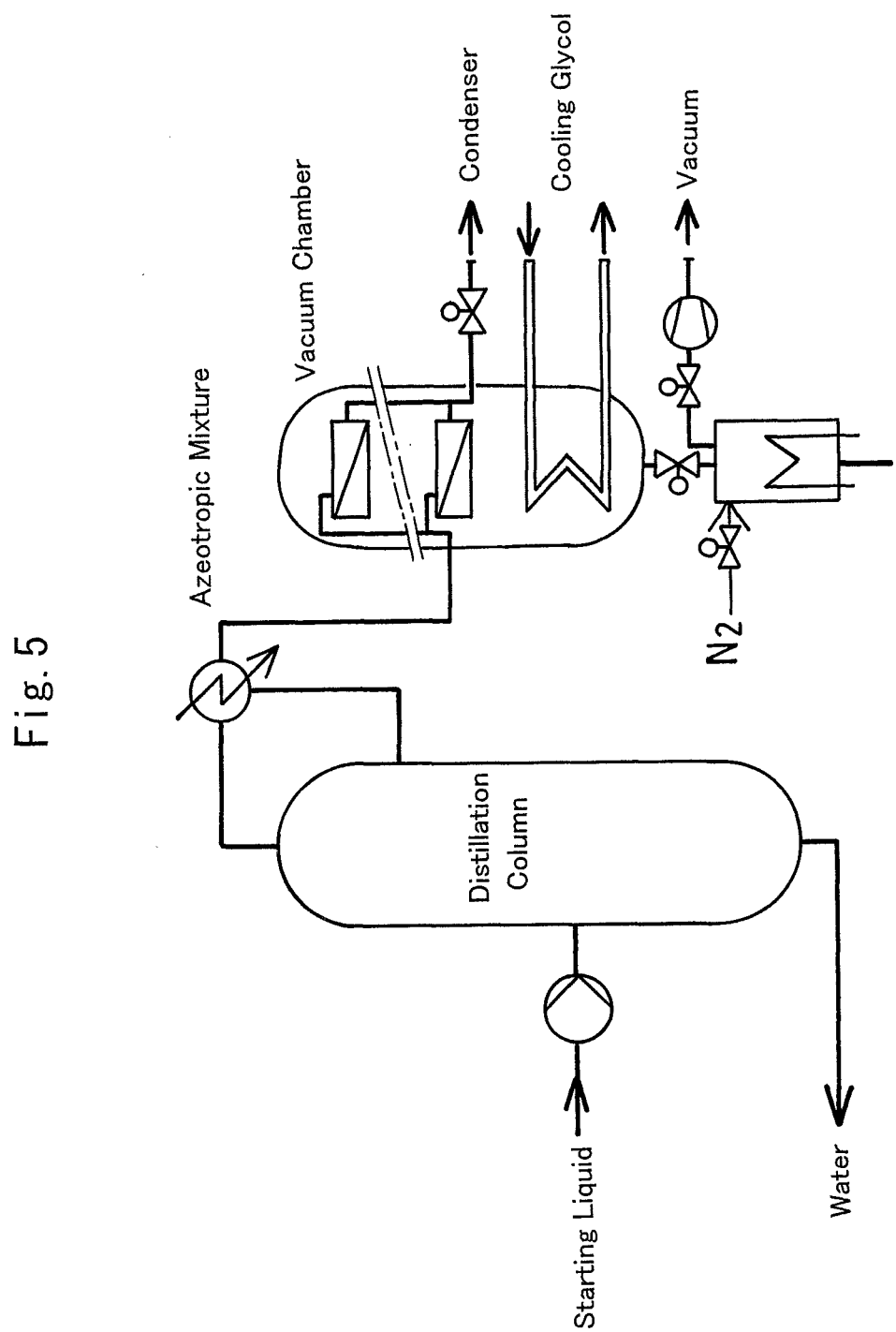
FIG. 5 is a flow diagram showing the system constitution in Non-Patent Reference 1.

The quantity of external heat necessary in the already-existing system in FIG. 3 and the quantity of external heat necessary in the system of the invention in FIG. 1 are compared, as follows:

INDUSTRIAL APPLICABILITY

According to the invention, there is provided a VP dewatering method being applicable over a wide range, having good handling properties and being economically efficient and highly energy-saving, which comprises compression-pressuring a dewatered vapor product to elevate the condensation temperature thereof and then re-using the same as a vaporization heat for a supply liquid.

The invention claimed is:

1. A method for dewatering a water-containing organic substance, which comprises dewatering a water-containing organic substance of a liquid starting material according to a vapor permeation membrane separation method, characterized in that the dewatered organic substance vapor discharged from a membrane module is pressurized with a compressor to elevate the condensation temperature of the vapor and then the vapor is fed to a vaporizer used in said method to collect and use the latent heat of condensation thereof.

2. The method for dewatering a water-containing organic substance according to claim 1, wherein the latent heat of

TABLE 1

| | Item | Conventional-Art System (FIG. 3) | System of the Invention (FIG. 1) |
|---|---|---|---|
| Decrease or Increase in Quantity of heat | Heating (water vapor) | $1.74 \times 10^6$ kcal/h for preheating and vaporization of liquid starting material (as saturation vapor at 150° C., 3.43 ton/h) | $3.7 \times 10^5$ kcal/h for vaporization of liquid starting material (as saturation vapor at 150° C., 0.73 ton/h) |
| | Cooling (cooling water) | $1.20 \times 10^6$ kcal/h for removal of latent heat of condensation of dewatered product vapor (with using cooling water from 32 to 40° C., the amount of circulation water, 150 ton/h) | unnecessary |
| Decrease or Increase in Power | Necessary power in compressor | unnecessary | 95 kW |
| Decrease or Increase in Devices | Vaporizer | necessary (standard) | Increased (in Examples, the temperature difference is ½, and when the U value does not change, the transfer face is 2 times. Preferably used is a horizontal tube liquid membrane-type vaporizer having a good U value.) |
| | Condenser | necessary (standard) | unnecessary |
| | Compressor | none | necessary |

For understanding the energy-saving effect in point of the economical aspect, when the vapor cost is estimated as ¥3000/kg and the power cost is as ¥10/kWh, then the increase in the electric expense of ¥950/h by estimate enables saving of heating vapor cost of ¥8100/h. As an index of the effectiveness in a case of saving the quantity of heat by using electric power, there is known COP (coefficient of performance). Both the energy units are combined and are compared with each other as a ratio thereof. COP>3 is taken as a rough indication of energy consumption. In the invention, COP=reduction in quantity of heat (1590 kW-thermal/95 kW-electricity)=16.7, and is extremely high, which confirms that the energy-saving effect of the invention is extremely high. The equipment cost for the compressor system may increase, but the investment thereto is expected to be recovered in a short period of time.

condensation of the dewatered organic substance vapor is used in the vaporizer, and thereafter the resulting high-temperature condensate is cooled by preheating of the starting material.

3. The method for dewatering a water-containing organic substance according to claim 1, wherein the latent heat of condensation of the dewatered organic substance vapor and an external fluid are used as the heating source for the vaporizer.

4. The method for dewatering a water-containing organic substance according to claim 1, wherein a horizontal tube bundle-type liquid membrane vaporizer of which the heat transfer coefficient change in temperature difference is small and which can keep high efficiency is used as vaporizer.

5. The method for dewatering a water-containing organic substance according to claim 1, wherein a zeolite membrane is used as the membrane.

* * * * *